(12) United States Patent
Obayashi et al.

(10) Patent No.: US 8,001,799 B2
(45) Date of Patent: Aug. 23, 2011

(54) MULTIPLE COOLING SOURCES FOR A VEHICLE AIR CONDITIONING SYSTEM

(75) Inventors: Kazuyoshi Obayashi, Chita-gun (JP); Keisuke Tani, Anjo (JP); Katsunori Tanaka, Haguri-gun (JP); Naoki Yamamoto, Chita-gun (JP); Takeshi Shimoyama, Kariya (JP); Yukihiro Yamashita, Takahama (JP)

(73) Assignee: Denso Corporation, Kariya (JP)

( * ) Notice: Subject to any disclaimer, the term of this patent is extended or adjusted under 35 U.S.C. 154(b) by 435 days.

(21) Appl. No.: 11/826,028

(22) Filed: Jul. 11, 2007

(65) Prior Publication Data

US 2008/0011005 A1    Jan. 17, 2008

(30) Foreign Application Priority Data

Jul. 12, 2006    (JP) ................. 2006-191166

(51) Int. Cl.
 B60H 1/32 (2006.01)
 F25B 5/00 (2006.01)
(52) U.S. Cl. ................. 62/243; 62/244; 62/199; 62/200
(58) Field of Classification Search .............. 62/236, 62/243, 230, 199, 200, 201; 700/299; 165/241
 See application file for complete search history.

(56) References Cited

U.S. PATENT DOCUMENTS

| 5,501,267 | A | * | 3/1996 | Iritani et al. | ........... 165/202 |
| 6,016,662 | A |   | 1/2000 | Tanaka et al. | |
| 6,598,671 | B1 | * | 7/2003 | Zeng et al. | ........... 165/240 |
| 6,830,438 | B2 |   | 12/2004 | Iwanami et al. | |
| 7,043,931 | B2 | * | 5/2006 | Plummer | ........... 62/236 |
| 7,096,683 | B2 | * | 8/2006 | Smith | ........... 62/200 |
| 7,130,719 | B2 | * | 10/2006 | Ehlers et al. | ........... 700/276 |
| 2004/0164616 | A1 | * | 8/2004 | Obayashi et al. | ........... 307/18 |

FOREIGN PATENT DOCUMENTS

| JP | 2001-088541 | 4/2001 |
| JP | 2001-241736 | 9/2001 |
| JP | 2002-036903 | 2/2002 |
| JP | 2003-063242 | 3/2003 |
| JP | 2003-136946 | 5/2003 |
| JP | 2005-219579 | 8/2005 |

OTHER PUBLICATIONS

Machine translation of JP 10-053019 to Tanaka, Air Conditioning Device for Vehicle, Feb. 24, 1998, all.*
Office Action (3 pgs.) dated Sep. 10, 2010 issued in corresponding Japanese Application No. 2006-191166 with an at least partial English-language translation thereof (3 pgs.).
Notice of Official Rejection (3 pgs.) dated Apr. 26, 2011 issued in corresponding Japanese Application No. 2006-191166 with an at least partial English-language translation thereof (3pgs.).

* cited by examiner

Primary Examiner — Marc E Norman
Assistant Examiner — Filip Zec
(74) Attorney, Agent, or Firm — Nixon & Vanderhye P.C.

(57) ABSTRACT

In an air-conditioning system for a vehicle, which has multiple heat sources (an evaporator and a heat accumulator), either one of the heat sources, for which the input energy amount for the unit cooling capacity is smaller than that for the other heat source, is preferentially used for performing the cooling operation, an energy amount for the air-conditioning operation can be reduced.

24 Claims, 12 Drawing Sheets

COMPRESSOR OUTPUT REQUIREMENT = $\dfrac{\text{COOLING CAPACITY REQUIREMENT}}{\text{COP}}$

US 8,001,799 B2

MULTIPLE COOLING SOURCES FOR A VEHICLE AIR CONDITIONING SYSTEM

CROSS REFERENCE TO RELATED APPLICATION

This application is based on Japanese Patent Application No. 2006-191166, which is filed on Jul. 12, 2006, the disclosure of which is incorporated herein by reference.

FIELD OF THE INVENTION

The present invention relates to an air-conditioning system for a vehicle.

BACKGROUND OF THE INVENTION

A conventional air-conditioning system for a vehicle is disclosed, for example, in Japanese Patent Publication No. H10-53019, which has a heat accumulator for storing heat of refrigerant (heat of cooling) in addition to an evaporator to which refrigerant compressed by a compressor is supplied. The compressor is driven by an internal combustion engine mounted on a vehicle. According to the conventional system, cooling operation can be continuously performed by use of the heat stored in the heat accumulator even during a period in which the engine operation is temporally stopped.

Another conventional air-conditioning system is disclosed, for example, in Japanese Patent Publication No. 2003-120544, in which the air-conditioning system has an electric motor as a driving source for the compressor, in addition to the internal combustion engine. When the engine operation is temporally stopped, as a function of an idling stop, the compressor is driven by the electric motor, so that the cooling operation for a vehicle inside is continuously carried out even during the period of the idling stop.

Although each of the above conventional air-conditioning systems has a function of continuing the cooling operation during the engine operation is stopped, cost increase is not avoidable because an additional component is necessary. In particular, frequency for such function (the continuous cooling operation during the engine stop) is not so high. Therefore, the advantage of the additional function becomes relatively smaller for the increase of cost for the additional component.

The above problem (relatively smaller effect for a large number of components) commonly exists not only in the above air-conditioning systems but also in a vehicle air-conditioning system having multiple thermal sources (for heat of cooling) or in a vehicle air-conditioning system having a compressor operated by multiple driving sources.

SUMMARY OF THE INVENTION

The present invention is made in view of the above problems. It is an object of the present invention to provide an air-conditioning system for a vehicle which has multiple thermal sources (heat sources), or an air-conditioning system for a vehicle in which a compressor is driven by multiple driving sources, wherein the air-conditioning system is effectively operated.

According to a feature of the present invention, an air-conditioning system for a vehicle has multiple heat sources for performing cooling operation, and means for selecting one of the heat sources such that the selected one of the heat sources, for which an input energy amount for a unit cooling capacity is smaller than that for the other heat source, is preferentially used for performing the cooling operation to control the temperature of the vehicle inside air.

As either one of the heat sources, for which the input energy amount for the unit cooling capacity is smaller than that for the other heat source, is preferentially used for performing the cooling operation, an energy amount for the air-conditioning operation can be reduced. In addition, the multiple heat sources can be effectively used.

According to another feature of the present invention, an air-conditioning system for a vehicle has multiple driving sources for driving a compressor to perform cooling operation, and means for selecting one of the driving sources such that the selected one of the driving sources, for which an input energy amount for a unit cooling capacity is smaller than that for the other driving source, is preferentially used for performing the cooling operation to control the temperature of the vehicle inside air.

As either one of the driving sources, for which the input energy amount for the unit cooling capacity is smaller than that for the other heat source, is preferentially used for performing the cooling operation, an energy amount for the air-conditioning operation can be reduced. In addition, the multiple driving sources can be effectively used.

According to a further feature of the present invention, an air-conditioning system for a vehicle has an evaporator to which refrigerant compressed by a compressor is supplied, wherein the compressor is driven by an engine for driving the vehicle, and a heat accumulator for storing the heat of the refrigerant. In the air-conditioning system, the heat accumulator can be selected, instead of the evaporator, as a heat source for performing cooling operation, even when the engine is in its operation.

In the above air-conditioning system, there are two heat sources (the evaporator and the heat accumulator). An input energy for a unit heat amount to be stored in the heat accumulator depends on an operation point of the engine at a time point for storing the heat, a vehicle speed, and so on. As a result, the input energy for the unit heat amount of the energy stored in the heat accumulator may become smaller than an input energy for the unit heat amount, which will be necessary under the current operation point of the engine for driving the compressor so that the evaporator is used as the heat source. According to the feature of the present invention, the heat accumulator is selectively used depending on the situation (an operational condition of the engine and/or vehicle, and other surrounding conditions), even in the case that the cooling operation can be carried out by the evaporator.

According to a still further feature of the present invention, an air-conditioning system for a vehicle has multiple driving sources for driving a compressor, wherein the multiple driving sources includes an internal combustion engine of the vehicle. In the air-conditioning system, the other driving source than the internal combustion engine can be selected, instead of the internal combustion engine, as the driving source for the compressor to perform cooling operation, even when the engine is in its operation.

In the above air-conditioning system, there are two driving sources for the compressor (e.g. the engine and the electric motor) An increased amount of fuel, which is necessary for driving the compressor, depends on the operation point of the engine, when the engine is used as the driving source for the compressor. Accordingly, it may occur depending on the current operation point of the engine, that the input energy amount can be smaller when the other driving source (e.g. the electric motor) is used than the case of using the engine. According to the feature of the present invention, the other driving source (the electric motor) is selectively used depending on the situation (an operational, condition of the engine and/or vehicle, and other surrounding conditions), even in the case that the compressor can be driven by the engine. As a result, the input energy, that is the fuel consumption by the engine can be reduced.

According to a still further feature of the invention, an air-conditioning system for a vehicle has a refrigerating cycle, which includes a compressor driven by an engine, a condenser, and an evaporator, wherein the compressor, the condenser, and the evaporator are connected in a closed circuit. The air-conditioning system further has a heat accumulator connected to the refrigerating cycle in parallel to the evaporator, so that refrigerant of the refrigerating cycle operatively flows in a closed circuit of the compressor, the condenser, and the heat accumulator.

In the air-conditioning system, an electronic control unit selects one of heat sources between the evaporator and the heat accumulator, in such a way that an input energy amount for a unit cooling capacity for the selected heat source is smaller than that for the other heat source, so that the selected heat source is preferentially used for performing cooling operation to control temperature of vehicle inside air.

According to a still further feature of the invention, an air-conditioning system for a vehicle has a refrigerating cycle, which includes a compressor to be operatively driven by an engine, a condenser, and an evaporator, wherein the compressor, the condenser, and the evaporator are connected in a closed circuit. The air-conditioning system further has an electric motor connected to a battery for selectively driving the compressor, when electric power is supplied from the battery to the electric motor.

In the above air-conditioning system, an electronic control unit selects the engine or the electric motor as a driving source for the compressor, in such a way that an input energy amount for a unit cooling capacity for the selected driving source is smaller than that for the non-selected driving source, so that the selected driving source is preferentially used for driving the compressor to perform cooling operation to control temperature of vehicle inside air.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

An air-conditioning system according to a first embodiment will be explained with reference to the drawings.

Figure 1:
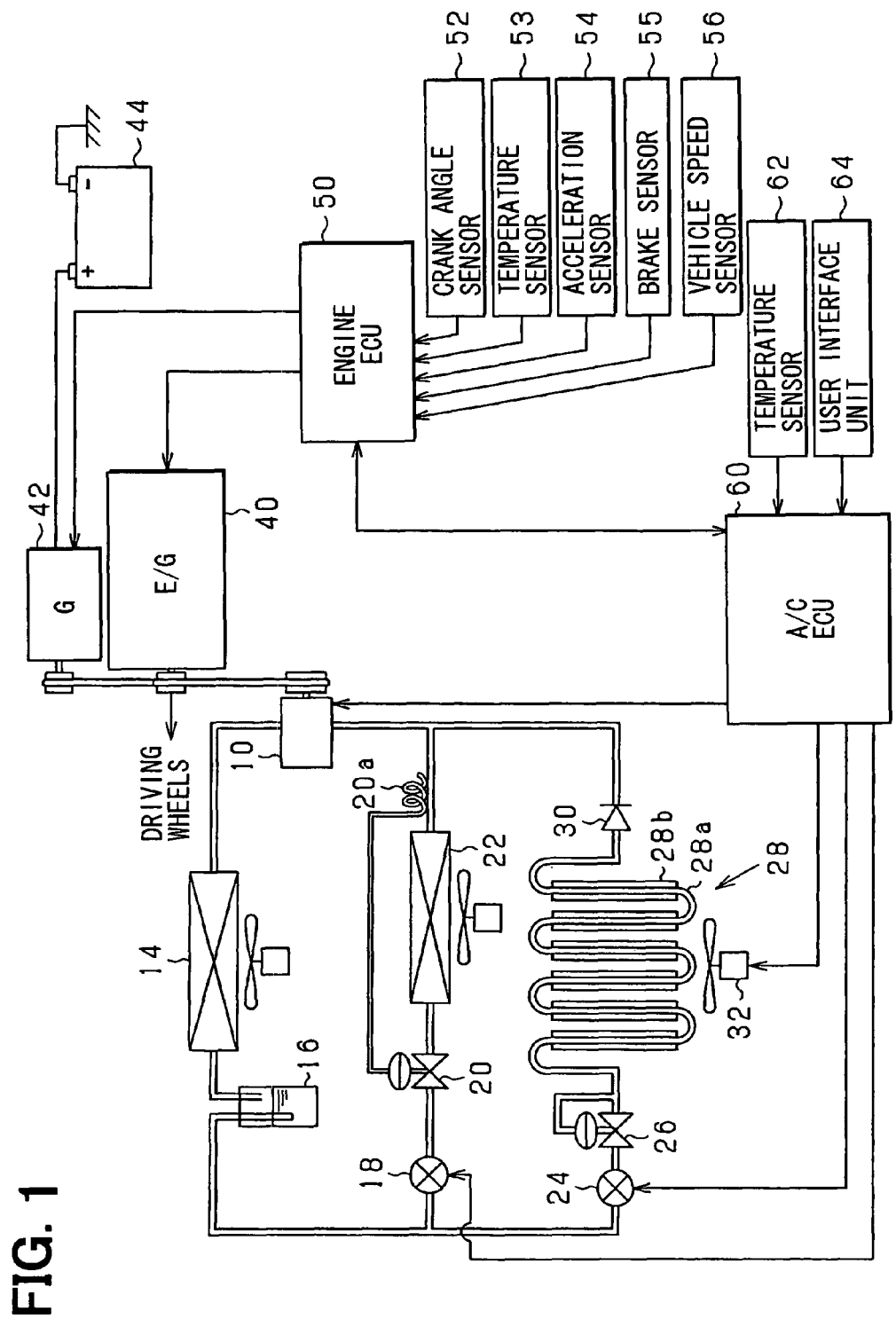
FIG. 1 is a schematic view showing a system structure of an air-conditioning system for a vehicle according to a first embodiment of the present invention.

FIG. 1 is a schematic view showing a system structure of an air-conditioning system for a vehicle according to the first embodiment of the present invention.

As shown in FIG. 1, refrigerant is compressed by a capacity variable type compressor 10 and supplied to a condenser 14. The refrigerant is then supplied to a receiver 16 for separating the refrigerant into liquid-phase and gas-phase refrigerant and temporally storing the liquid-phase refrigerant. The refrigerant of the receiver 16 is supplied to an expansion valve 20 of a temperature dependent type through an electromagnetic valve 18. The refrigerant is rapidly expanded by the expansion valve 20, so that the refrigerant is atomized. The atomized refrigerant is vaporized in an evaporator 22 through heat-exchange with outside air. A temperature sensing pipe 20a of the expansion valve 20 is provided at an outlet side of the evaporator 22, which is connected to an inlet side of the compressor 10.

The refrigerant of the receiver 16 is also supplied to another (second) expansion valve 26 through another (second) electromagnetic valve 24. The refrigerant is also rapidly expanded by the expansion valve 26, so that the refrigerant is atomized. The atomized refrigerant absorbs heat from a thermal storage pack 28b at a vaporizing pipe 28a of a heat accumulator 28, so that the refrigerant is vaporized. As a result, the heat of cooling is stored in the thermal storage pack 28b. An outlet side of the heat accumulator 28 is connected to the inlet side of the compressor 10 through a check valve 30. A cooling fan 32 is provided adjacent to the heat accumulator 28.

According to the air-conditioning system of the above structure, not only a passenger room of the vehicle can be cooled by the evaporator 22 but also the heat accumulator 28 can be cooled, when the compressor 10 is operated. Furthermore, cooling air can be generated by cooperation of the cooling fan 32 and the heat accumulator 28.

The compressor 10 is driven by an internal combustion engine 40 for the vehicle, a driving force of which is transmitted to driving wheels of the vehicle. An electric power generator 42 is connected to an output shaft of the engine 40, in addition to the compressor 10. Electric energy generated at the electric power generator 42 is supplied to a battery 44.

An engine electronic control unit (an engine ECU) 50 is connected to a crank angle sensor 52 for detecting a rotational speed of the output shaft of the engine 40, a temperature sensor 53 for detecting a temperature of outside air, an acceleration sensor 54 for detecting an operational stroke of an acceleration pedal, a brake sensor 55 for detecting a braking operation by a vehicle driver, a vehicle speed sensor 56 for detecting a vehicle (running) speed, and so on. The engine ECU 50 controls an output of the engine 40, a generated amount of the electric power at the generator 42, and so on, based on the detected amounts of the above sensors. For example, the generated amount of the electric power at the generator 42 is increased to carry out a regenerative control, when the operational stroke of the acceleration pedal detected by the acceleration sensor 54 becomes zero, or when the braking operation is detected by the brake sensor 55.

An electronic control unit 60 for an air conditioning operation (an A/C ECU 60) is connected to a temperature sensor 62 for detecting a temperature of vehicle inside air, an interface unit 64 for receiving command signals from a user (the vehicle driver), and so on. The A/C ECU 60 and the engine ECU 50 perform mutual communication, so that A/C ECU 60 reads the information from the engine ECU 50. The A/C ECU 60 controls operations of the compressor 10, the electromagnetic valves 18 and 24, and the cooling fan 32, based on the input signals, so that the temperature of the inside air of the vehicle is controlled at a demanded value which is inputted to the A/C ECU 60 through the interface unit 64.

The A/C ECU 60 switches over from a temperature control at the evaporator 22 to a temperature control at the heat accumulator 28, and vice versa, during an operation of controlling the temperature of the vehicle inside air, in such a manner that an amount of input energy is minimized. The amount of the input energy here is an amount of energy which is inputted to the vehicle for the purpose of controlling the temperature of the inside air. According to the embodiment, fuel is inputted to the engine 40 of the vehicle, and the compressor 10 is operated by the combustion of the fuel. Therefore, the amount of input energy is defined as an amount of fuel inputted to the engine (the vehicle) for the purpose of controlling the temperature of the vehicle inside air. Accordingly, the A/C ECU 60 switches over from the temperature control at the evaporator 22 to the temperature control at the heat accumulator 28, and vice versa, in such a manner that an amount of fuel consumption is minimized. The operation will be further explained in detail below.

Figure 2:
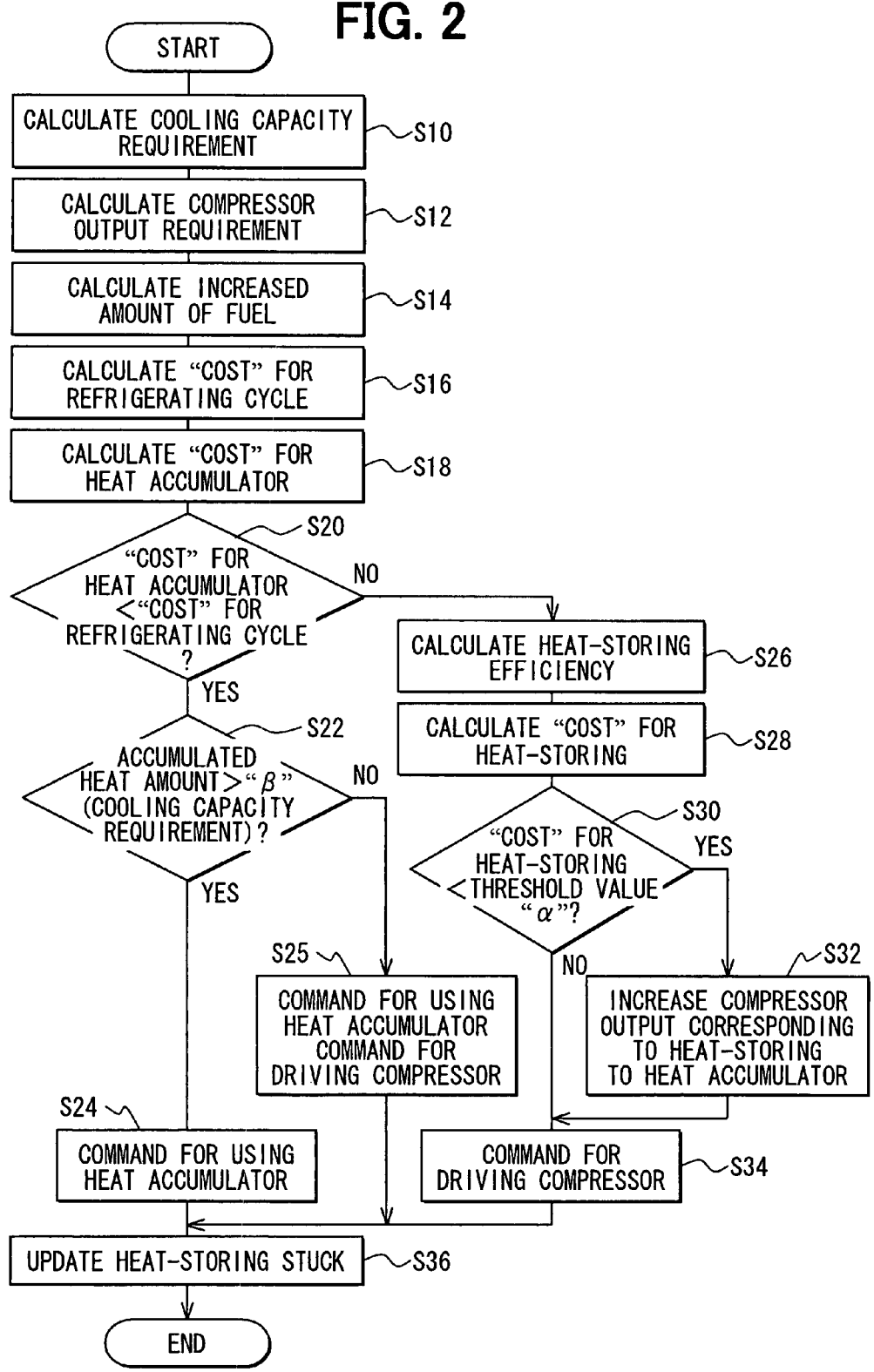
FIG. 2 is a flowchart showing a process for controlling an air-conditioning operation for a vehicle passenger room.

FIG. 2 is a flowchart showing a process for controlling the temperature of the vehicle inside air. The process is repeatedly carried out at a predetermined interval.

At a step S10, the A/C ECU 60 (hereinafter simply referred to as the ECU 60) calculates cooling capacity requirement, which satisfies demand of the user inputted to the ECU 60 through the interface unit 64. For example, the ECU 60 calculates the cooling capacity requirement in such a manner that a difference of a desired temperature set by the user and the air temperature of the vehicle detected by the temperature sensor 62 is minimized. A unit for the cooling capacity requirement can be chosen at your option. Watt (W) is used in the embodiment as an example for the unit.

At a step S12, the ECU 60 calculates a compressor output requirement for the compressor 10, so that the cooling capacity requirement is realized. The process is carried out, because the cooling capacity is changed depending on circumstances surrounding the air conditioning system, even when the output of the compressor 10 is constant. For example, the cooling operation at the condenser 14 is facilitated (that is, the cooling capacity of the condenser 14 is increased), namely, the cooling capacity of the cooling operation is increased, as the vehicle speed is higher and/or the ambient temperature is lower.

Figure 3:
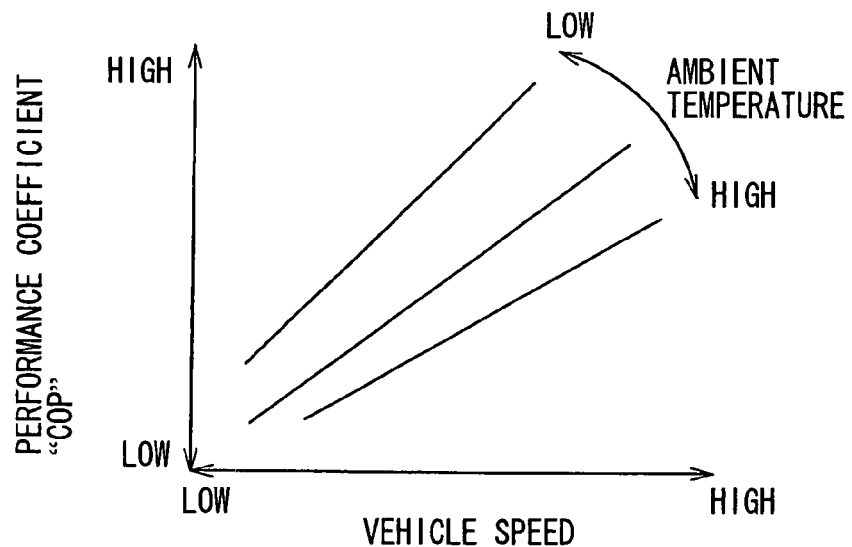
FIG. 3 is a graph showing a relation between a coefficient of performance and a vehicle speed and outside (ambient) temperature.

Therefore, relations between performance coefficient "COP" and the vehicle speed as well as the ambient temperature are decided in advance, as shown in FIG. 3. The compressor output requirement is finally calculated by dividing the cooling capacity requirement by the performance coefficient "COP". For example, in the case that the cooling capacity requirement is "3,000 W" and the performance coefficient "COP" is "2", the compressor output requirement becomes "1,500 W". A unit for the compressor output can be also chosen at your option. Watt (W) is used in the embodiment as an example for the unit.

Figure 4:
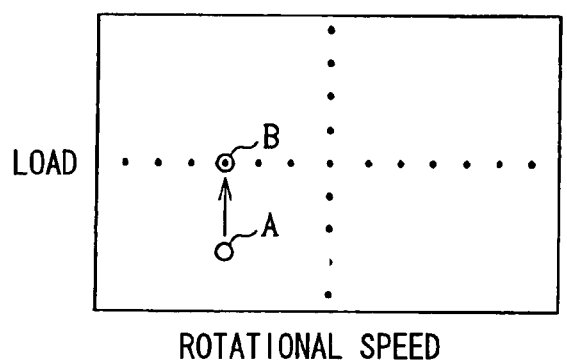
FIG. 4 is a map showing a relation between an operation point of an engine for driving a compressor and an increase amount of fuel.

At a step S14, the ECU 60 calculates an increased amount of fuel consumption necessary for the engine 40 to produce the compressor output requirement. The increased amount of the fuel for the engine 40 to produce the compressor output requirement depends on an operation point of the engine 40. Therefore, the ECU 60 calculates the increased amount of the fuel based on the operation point. For example, a map, such as a map shown in FIG. 4, showing relations between fuel consumption and the engine rotational speed and load (torque) is prepared in advance. Then, the ECU 60 calculates the increased amount of the fuel based on the detected current values for the operation point (the engine rotational speed and load) in accordance with the map.

More exactly, in the case that the current operation point is at a point "A", the operation point "B" of the engine for driving the compressor 10 at the output calculated at the step S12 can be primarily decided, when the engine rotational speed for driving the compressor 10 is constant. This is because the additional torque for the engine 40 is decided by dividing the compressor output power by the compressor rotational speed.

When the operation point "B" for driving the compressor 10 is decided as above, a difference of the fuel consumption between the operation points "A" and "B" is the increased amount of the fuel. In the case that the braking operation is carried out or the regenerative control is performed, the increased amount of the fuel for the engine 40 is calculated as "zero".

When the increased amount of the fuel for the engine 40 is calculated as above, the ECU 60 calculates at a step S16 a "COST", which is necessary for achieving the cooling capacity requirement calculated at the step S10 by a refrigerating cycle having the compressor 10, the condenser 14 and the evaporator 22. The "COST" here is a parameter for quantifying the input amount of the energy for realizing a unit cooling capacity. In the embodiment, the "COST" is quantified by the increased amount of the fuel (g/kWh), which is consumed for the unit cooling capacity. That is, the "COST" is the energy amount of the fuel, which is inputted for the unit cooling capacity. For example, in the case that the cooling capacity requirement is "3,000 W" and the increased amount of the fuel "300 g/h", the "COST" is calculated as "100 g/kWh".

At a step S18, the ECU 60 calculates a "COST" for using the heat accumulator 28 to realize the above cooling capacity requirement. A method for quantifying the "COST" by use of the heat accumulator 28 can be chosen at your option. However, it is more preferable to make a dimension for the quantifying method at the step S18 to be identical to that for the "COST" used at the step S16. When the cooling operation for the vehicle is carried out by the heat accumulator 28, the heat (the heat of cooling) stored in the heat accumulator 28 is consumed. Therefore, when the cooling capacity requirement is realized by the use of the heat accumulator 28, the ECU 60 calculates the heat (heat of cooling) which was necessary to produce the current heat of cooling stored in the heat accumulator 28.

Figure 5A:
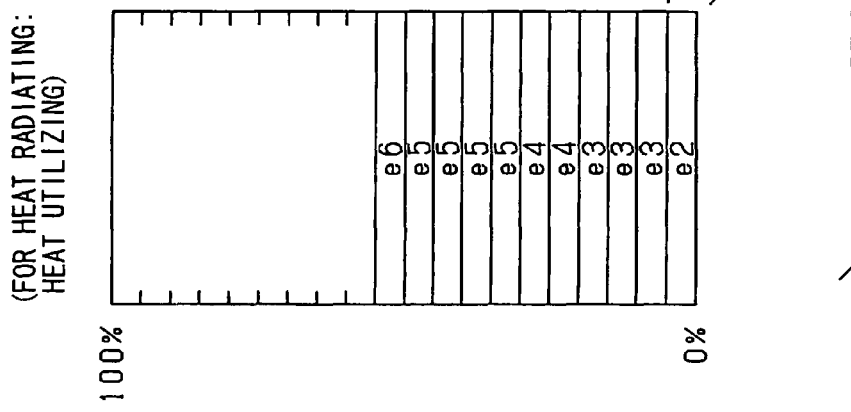
FIGS. 5A and 5B are schematic views showing memorizing modes for storing heat in a heat accumulator and input energy amount.
Figure 5B:
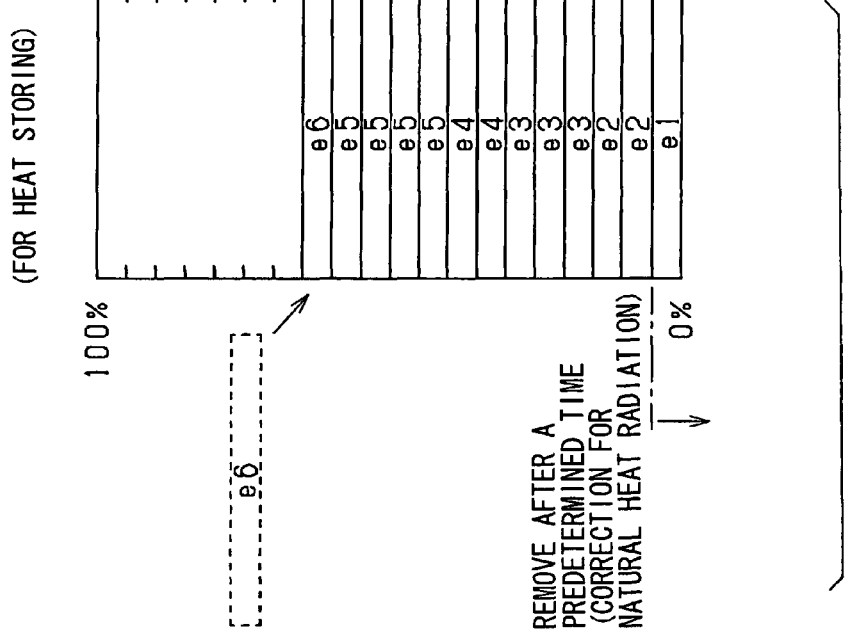

A table (stuck) of First-In-First-Out (FIFO) shown in FIGS. 5A and 5B is used for the purpose of calculating the heat (heat of cooling) which was necessary to produce the current heat of cooling stored in the heat accumulator 28. As shown in FIG. 5A, each time when the unit heat (heat of cooling) is stored in the heat accumulator 28, energy amount for such unit heat is calculated and memorized. Namely, when the unit heat (heat of cooling) is newly stored in the heat accumulator 28, one heat-storing unit (one stuck) is added, as shown in FIG. 5A. At the same time, energy amount "e6", which was necessary for producing the unit heat, is memorized for such heat-storing unit (the stuck). A method for quantifying the energy amount "e6" can be chosen at your option. The unit is defined in the embodiment as a fuel consumption amount "g/kWh" with respect to the accumulated heat amount for the unit cooling capacity.

As shown in FIG. 5B, each time when the unit heat is radiated from the heat accumulator 28, one of the heat-storing units (the stuck) which is memorized in the table and which is the oldest among those heat-storing units is removed from the table. FIG. 5B shows a situation, in which a doubled amount of the unit heat is consumed so that two of the heat-storing units are removed.

The "COST" for generating the cooling capacity requirement by use of the heat accumulator 28 can be calculated by the above table. For example, the heat amount, which is necessary for achieving the cooling capacity requirement calculated at the step S10, is taken away from the accumulated heat in such a manner that the oldest heat-storing units are sequentially taken away. Then, an average energy amount for those heat-storing units is calculated. For example, when the cooling capacity requirement corresponds to a triplication of the heat-storing units in FIG. 5B, the average energy amount for those heat-storing units is calculated by "(e2+e3+e3)/3". Instead of the above calculation, an average energy amount may be calculated for all of the heat accumulated in the heat accumulator 28.

The heat stored in the heat accumulator 28 is decreased by a natural radiation of the heat of cooling to the outside (heat absorption of positive heat from the outside). Accordingly, the accumulated heat amount is corrected by such a decreased amount caused by the natural radiation, independently whether there is the accumulation of the heat to or the use of the heat (the heat radiation during the use) from the heat accumulator 28. This correction can be done, as shown in FIGS. 5A and 5B, by removing the oldest heat-storing unit, whenever a predetermined time passes by. The predetermined time is a time period during which a heat amount corresponding to the heat-storing unit is lost due to the natural radiation. The predetermined time may be varied depending on the ambient temperature surrounding the heat accumulator 28. Alternatively, the accumulated heat amount in the table may be corrected by detecting the current accumulated heat amount in the heat accumulator 28.

At a step S20 shown in FIG. 2, the ECU 60 determines whether the "COST" for realizing the cooling capacity requirement by use of the heat accumulator 28 is smaller than the "COST" for realizing the cooling capacity requirement by the refrigerating cycle. Namely, the ECU 60 determines whether the "COST" calculated at the step S18 is smaller than the "COST" calculated at the step S16. In the case that the "COST" by the heat accumulator 28 is lower than that by the refrigerating cycle, the process goes to a step S22, at which the ECU 60 determines whether the accumulated heat amount is larger than a predetermined threshold "β". This process is carried out to determine whether the accumulated heat amount of the heat accumulator 28 is enough to realize the cooling capacity requirement. The predetermined threshold "β" is changed depending on the cooling capacity requirement. More exactly, the predetermined threshold "β" is selected as such a value, at which the cooling operation for the vehicle passenger room can be further continued for a certain time period by use of the heat accumulator 28, even when the engine operation is stopped after the use of the heat accumulator 28.

When the accumulated heat amount is larger than the predetermined threshold "β", at the step S22, the process goes to a step S24 at which the heat accumulator 28 is used for the cooling operation. The accumulated amount here is defined as a positive figure. Therefore, the positive figure becomes larger as the accumulated amount for the heat of cooling (the negative heat) is larger. On the other hand, when the accumulated heat amount is smaller than the predetermined threshold "β", at the step S22, the process goes to a step S25. At the step S25, the cooling capacity, which will be running short in the cooling operation by the heat accumulator 28, is compensated by the evaporator 22. In other words, the cooling operation by use of the heat accumulator 28 is carried out as much as possible, on one hand. And on the other hand, the compressor output is calculated and the compressor 10 is operated, so that the cooling operation by the refrigerating cycle (by the operation of the compressor 10 and the evaporator 22) may compensate such an amount of the cooling capacity, which is otherwise running short in the cooling operation by the heat accumulator 28 alone.

When the determination at the step S20 is "NO", the process goes to a step S26. The ECU 60 performs the process at the steps S26 to S32, to determine whether an operation for storing the heat in the heat accumulator 28 is carried out or not. At first, the ECU 60 calculates at the step S26 heat-storing efficiency. The heat-storing efficiency here is efficiency when storing the heat (heat of cooling) in the heat accumulator 28, wherein the heat (heat of cooling) is generated in the refrigerating cycle by opening the electromagnetic valve 24 during the compressor 10 is in its operation. The efficiency may be in advance decided and memorized as a fixed figure. And the figure for the efficiency may be varied depending on the temperature of the vehicle inside air. This is because the heat-storing efficiency is considered to be decreased more as the temperature of the vehicle inside air is higher, in view of the fact that the higher the temperature of the vehicle inside air is, the more an amount of heat absorbing from the air is increased when storing the heat to the heat accumulator 28.

Figure 6:
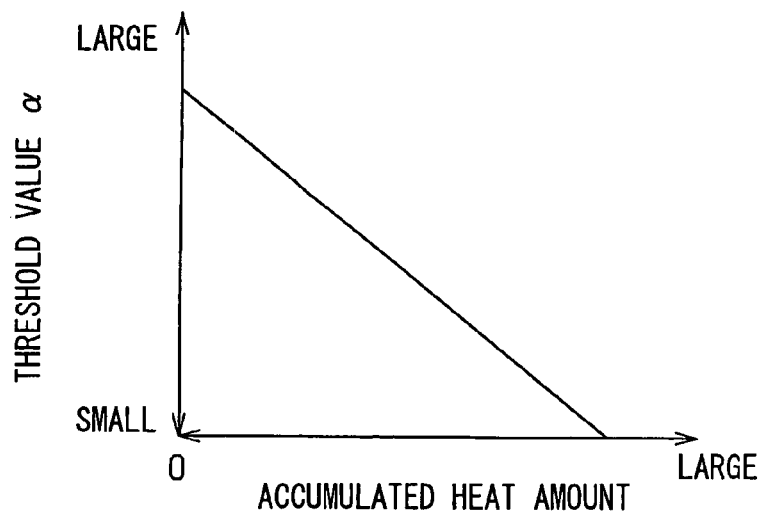
FIG. 6 is a graph showing a relation between the accumulated heat amount and a threshold value.

The process goes from the step S26 to the step S28, when the above calculation is completed. The ECU 60 calculates at the step S28 "COST" for heat-storing based on the calculated heat-storing efficiency. For example, the "COST" for heat-storing is calculated by dividing the "COST" calculated at the step S16 by the heat-storing efficiency. In the case that the "COST" calculated at the step S16 is, for example, "100 g/kWh" and the heat-storing efficiency is "0.8", the "COST" for heat-storing is calculated as "125 g/kWh". The ECU 60 determines at the following step S30, whether the "COST" for heat-storing is smaller than a threshold value "α". This process is carried out for determining whether it is in a preferable condition for storing the heat in the heat accumulator 28. As shown in FIG. 6, the threshold value "α" is so set as to become a smaller value in proportion to an increase of the accumulated heat amount. This is a prerequisite for storing the heat in the heat accumulator 28, when the heat-storing operation is carried out under a condition of a small input energy, namely under the condition of the lower "COST".

In the case that the ECU 60 determines, at the step S30, that the "COST" for heat-storing is smaller than the threshold value "α", the process goes to a step S32 to increase the output of the compressor 10 for performing the heat-storing operation for a certain amount of the heat. When the calculation of the step S32 has ended, or when the determination at the step S30 is "NO", the process goes to a step S34, at which the output (operating capacity) of the compressor 10 is controlled based on the compressor output requirement calculated at the step S12 or the step S32. It is preferable, during the step S34, to also increase the output torque of the engine 40 in accordance with the increase of the load applied by the compressor 10 to the engine 40. The increase of the output torque of the engine 40 can be achieved, for example, by correcting to increase an opening degree of a throttle valve in case of a gasoline engine, or by correcting to increase a fuel injection amount in case of a diesel engine.

When the process of the step S24 or the step S34 has ended, the process further goes to a step S36, at which the table shown in FIG. 5 is updated in accordance with the result of the process at the step S24 or the step S32.

The above explained embodiment has the following advantages.

(1) The air-conditioning system has the evaporator 22, to which the refrigerant compressed by the compressor 10 is supplied, and the heat accumulator 28 for storing the heat (heat of cooling) of the refrigerant. The temperature of the vehicle inside air is controlled by a preferential use of the evaporator 22 or the heat accumulator 28, whichever can achieve the temperature control at the smaller input energy amount for the unit cooling capacity. As a result, the fuel consumption can be reduced and the heat accumulator 28 can be effectively utilized.

(2) The cycle input energy amount (the calculated amount at the step S16), which corresponds to the input energy amount to the compressor 10 for the purpose of achieving the unit cooling capacity by use of the evaporator 22, is calculated. The heat-storing input energy amount (the calculated amount at the step S18), which corresponds to the input energy amount to the heat accumulator 28 for the unit heat amount, is likewise calculated, wherein the unit heat amount is consumed for the purpose of achieving the unit cooling capacity. Then, the evaporator 22 and the heat accumulator 28 are used in a suitable manner (selectively used and/or simultaneously used) based on the above input energy amounts. Accordingly, the input energy amounts can be more exactly calculated depending on the current condition. This means that the evaporator 22 and the heat accumulator 28 can be selected more appropriately.

(3) The cycle input energy amount (the calculated amount at the step S16) is calculated based on the operation point of the engine 40. The cycle input energy amount can be, thereby, calculated more exactly.

(4) The heat-storing input energy amount (the calculated amount at the step S18) is calculated based on the data memorized in the table shown in FIGS. 5A and 5B. The heat-storing input energy amount can be, thereby, calculated more exactly.

(5) When the accumulated heat amount of the heat accumulator 28 is smaller than the predetermined threshold "β", the evaporator 22 is also used, independently of the input energy amount for the unit heat amount. Accordingly, such a situation, in which the accumulated heat amount runs short, can be avoided.

(6) When the "COST" for the heat-storing is smaller than the threshold value "α", the heat-storing operation is carried out for the heat accumulator 28. As a result, the accumulated heat amount in the heat accumulator 28 can be increased when the "COST" for the heat-storing is low.

Second Embodiment

A second embodiment will be explained with reference to the drawings, by focusing on different points from the first embodiment.

According to the second embodiment, the refrigerating cycle (the evaporator 22) and the heat accumulator 28 are selectively used depending on the operation point of the engine 40, when the temperature of the vehicle inside air is controlled. More exactly, the refrigerating cycle and the heat accumulator 28 are selectively used depending on the rotational speed and the load (the torque) of the engine 40, in accordance with a map shown in FIG. 7.

Figure 8:
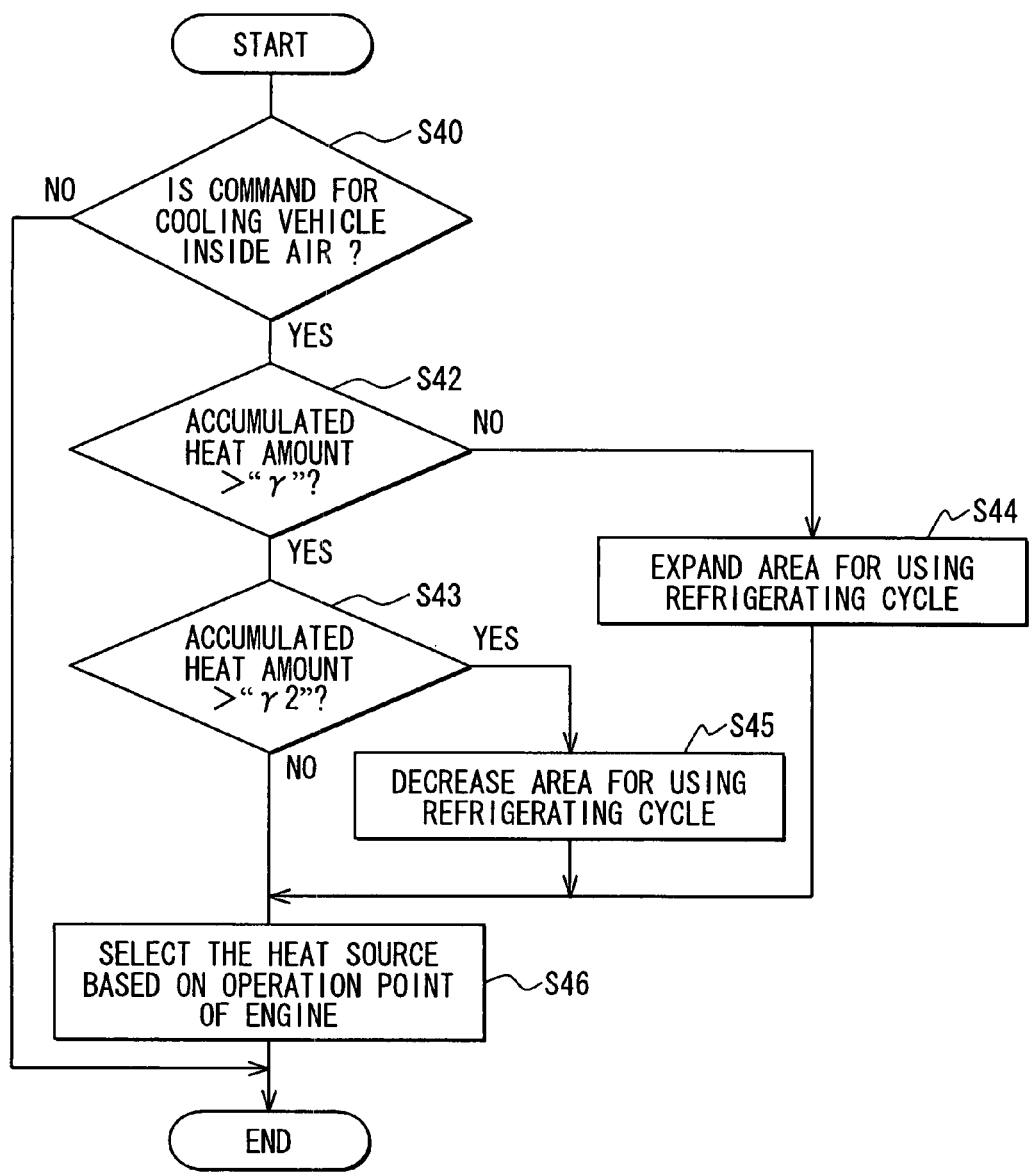
FIG. 8 is a flowchart showing a process for controlling an air-conditioning operation according to the second embodiment.

FIG. 8 shows a flowchart for a process of controlling the temperature of the vehicle inside air according to the embodiment. The process of FIG. 8 is repeatedly carried out by the ECU 60 at a predetermined interval.

At first, the ECU 60 determines at a step S40, whether there is a command for cooling the vehicle inside air, based on the operations of the user interface unit 64 and/or the temperature of the vehicle inside air. When "YES" at the step S40, the process goes to a step S42 to determine whether the accumulated heat amount is larger than a predetermined value "γ".

Figure 7:
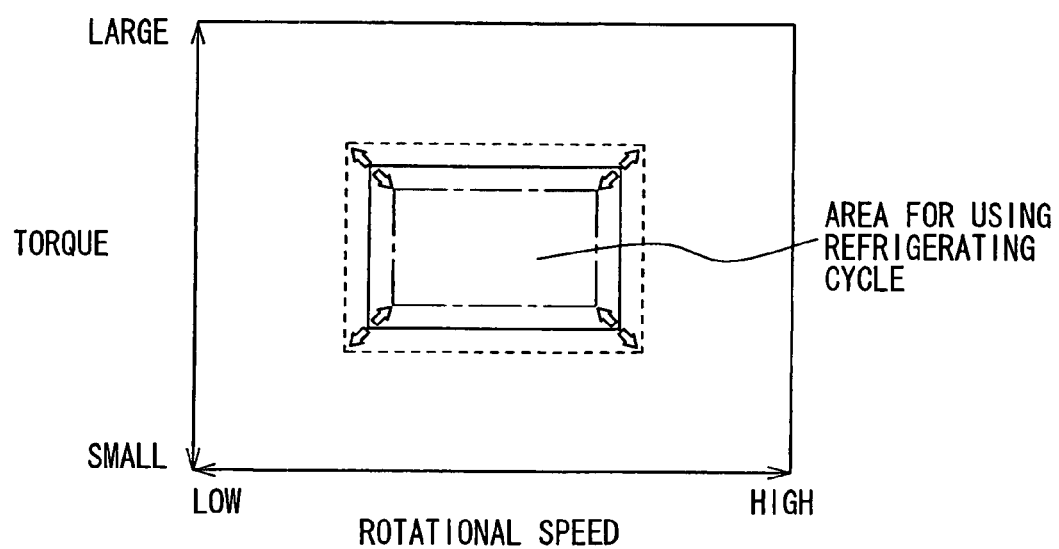
FIG. 7 is a map according to a second embodiment showing an area for using the refrigerating cycle.

If the use of the heat accumulator 28 was decided simply based on the map shown in FIG. 7, in which an area for using the refrigerating cycle was fixed, the accumulated heat amount may run short. Accordingly, in the case that the accumulated heat amount is smaller than the predetermined value "γ", the ECU determines that the refrigerating cycle is preferentially used. Therefore, when the determination at the step S42 is "NO", the area for using the refrigerating cycle is expanded at a step S44, as indicated by a dotted line in FIG. 7.

On the other hand, when the determination at the step S42 is "YES", the ECU 60 determines at a step S43 whether the accumulated heat amount is larger than a predetermined value "γ2" ("γ2">"γ"). This step is carried out for determining whether there is a sufficient amount for the accumulated heat in the heat accumulator 28 and therefore there is no need for the operation of the compressor 10. When the determination at the step S43 is "YES", the area for using the refrigerating cycle is decreased at a step S45, as indicated by a one-dot-chain line in FIG. 7.

Then, when the determination at the step S43 is "NO", or when the process at the step S44 or S45 has ended, the ECU 60 selects at a step S46 based on the map of FIG. 7, which heat source between the refrigerating cycle and the heat accumulator 28 is used.

According to the embodiment, the heat-storing to the heat accumulator 28 may be carried out in the same manner as disclosed in the prior art (e.g. Japanese Patent Publication H10-53019). An area for the heat-storing may be in advance decided in the map of FIG. 7, so that the heat-storing operation may be carried out in the area in which the "COST" for the heat-storing is minimized.

The above explained second embodiment has the following advantages.

(1) The map is in advance prepared, according to which the evaporator 22 or the heat accumulator 28 is selected depending on the current operation point of the engine 40. Accordingly, it is possible to reduce a volume of information for which the ECU 60 communicates with other systems, and also to reduce calculation load for the ECU 60, when the ECU 60 selects the evaporator 22 or the heat accumulator 28 in order to reduce the fuel consumption.

(2) When the accumulated heat amount is smaller than "γ", the area for using the refrigerating cycle is expanded, whereas when the accumulated heat amount is larger than "γ2", the area for using the refrigerating cycle is decreased. As a result, the decrease of the accumulated heat amount in the heat accumulator 28 can be suppressed in a proper manner, and an unnecessary consumption of the fuel for the engine 40 can be suppressed.

Third Embodiment

A third embodiment will be explained with reference to the drawings, by focusing on different points from the first embodiment.

Figure 9:
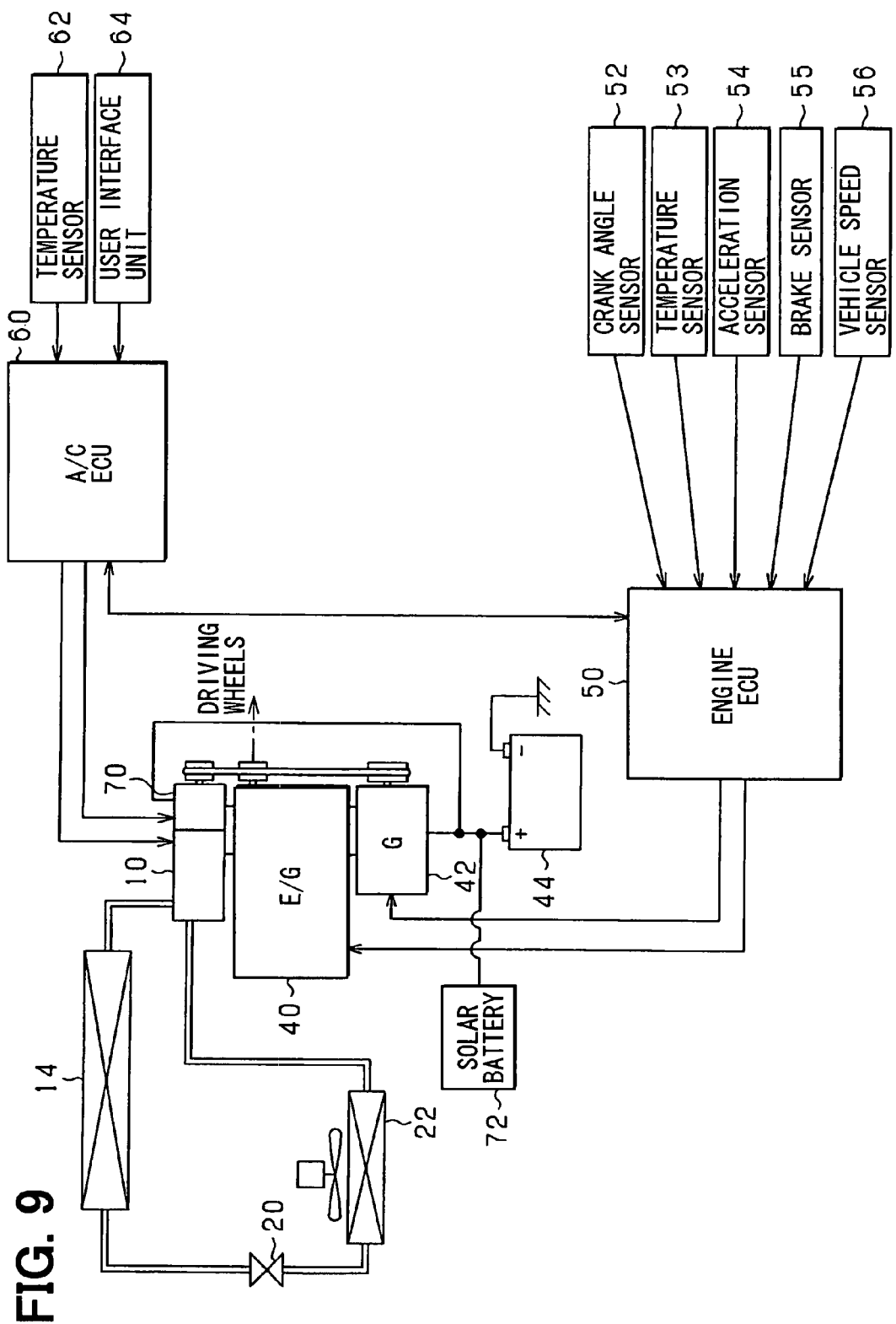
FIG. 9 is a schematic view showing a system structure of an air-conditioning system for a vehicle according to a third embodiment.

FIG. 9 shows a system structure of an air-conditioning system for a vehicle according to a third embodiment. The same reference numerals are used in the third embodiment for those parts, which are identical or similar to those of the first embodiment (FIG. 1). According to the embodiment, an electric motor 70 is provided as a driving source for driving the compressor 10 in addition to the engine 10 A solar battery 72 is further provided for the purpose of generating the electrical power which will be charged into the battery 44.

Figure 10:
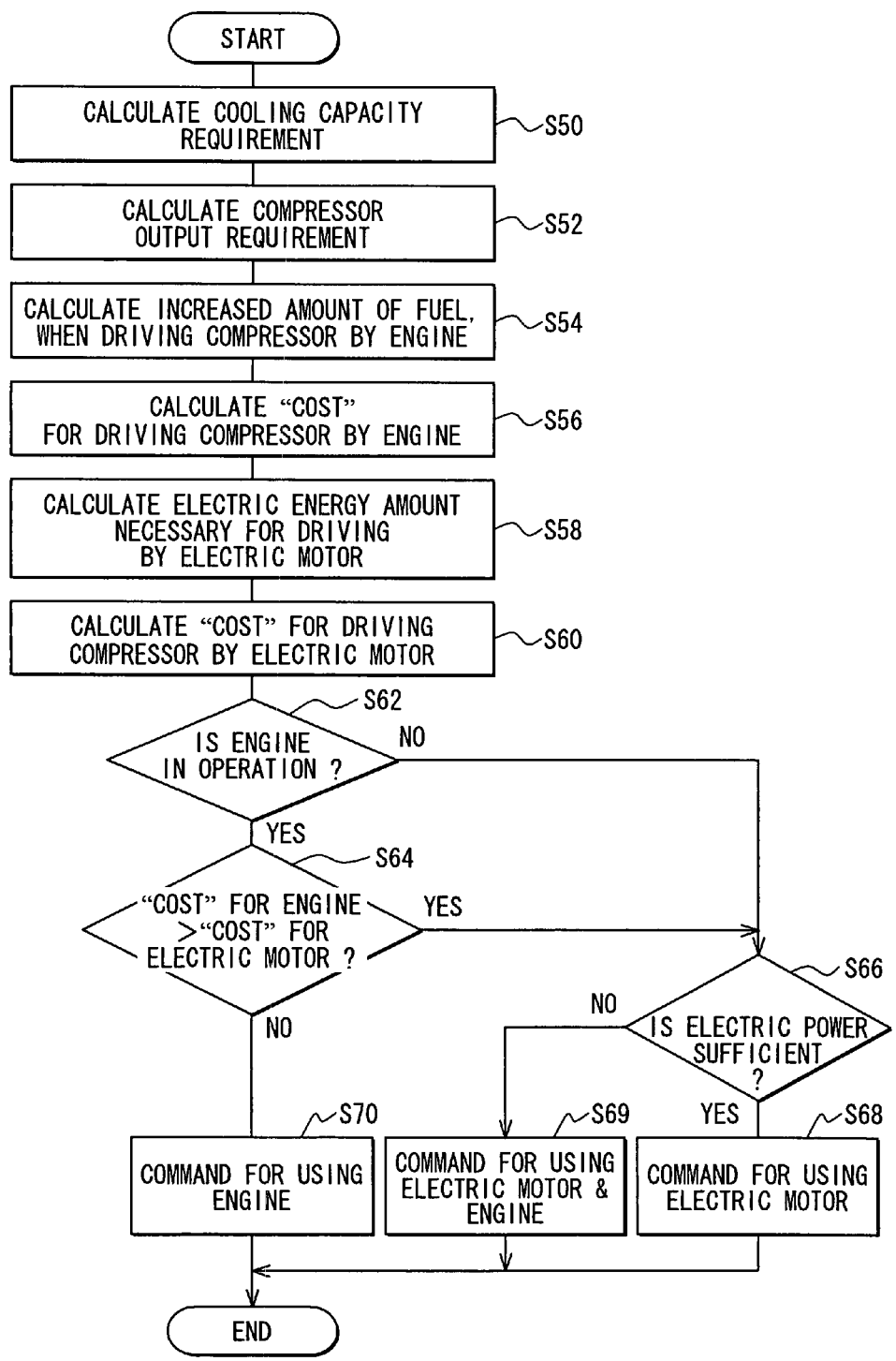
FIG. 10 is a flowchart showing a process for controlling an air-conditioning operation according to the third embodiment.

FIG. 10 shows a flowchart for a process of controlling the temperature of the vehicle inside air according to the embodiment. The process of FIG. 10 is repeatedly carried out by the ECU 60 at a predetermined interval.

At steps S50 to S56, the ECU 60 carries out the same processes to the steps S10 to S16 of FIG. 2. However, at the step S54, the ECU 60 calculates the increased amount of the fuel consumption based on the operation point at the engine idling operation, in the same manner to the step S14 of FIG. 2, if the engine 40 is not in operation.

At a step S58, the ECU 60 calculates electric energy amount necessary for the electric motor 70 to realize the cooling capacity requirement. The electric energy amount may be calculated by dividing the compressor output requirement calculated at the step S52 by efficiency of the electric motor. The efficiency of the electric motor is efficiency of the output of the compressor 10 driven by the electric motor 70. Therefore, for example, when the compressor output requirement is "1,500 W" and the efficiency is "0.75", then the required electric energy amount becomes "2,000 W".

At the following step S60, the ECU 60 calculates "COST" for motor driving for the electric motor 70. The "COST" here is likewise defined as the parameter for quantifying the input amount of the energy for realizing the unit cooling capacity, as explained in the first embodiment.

Figure 11:
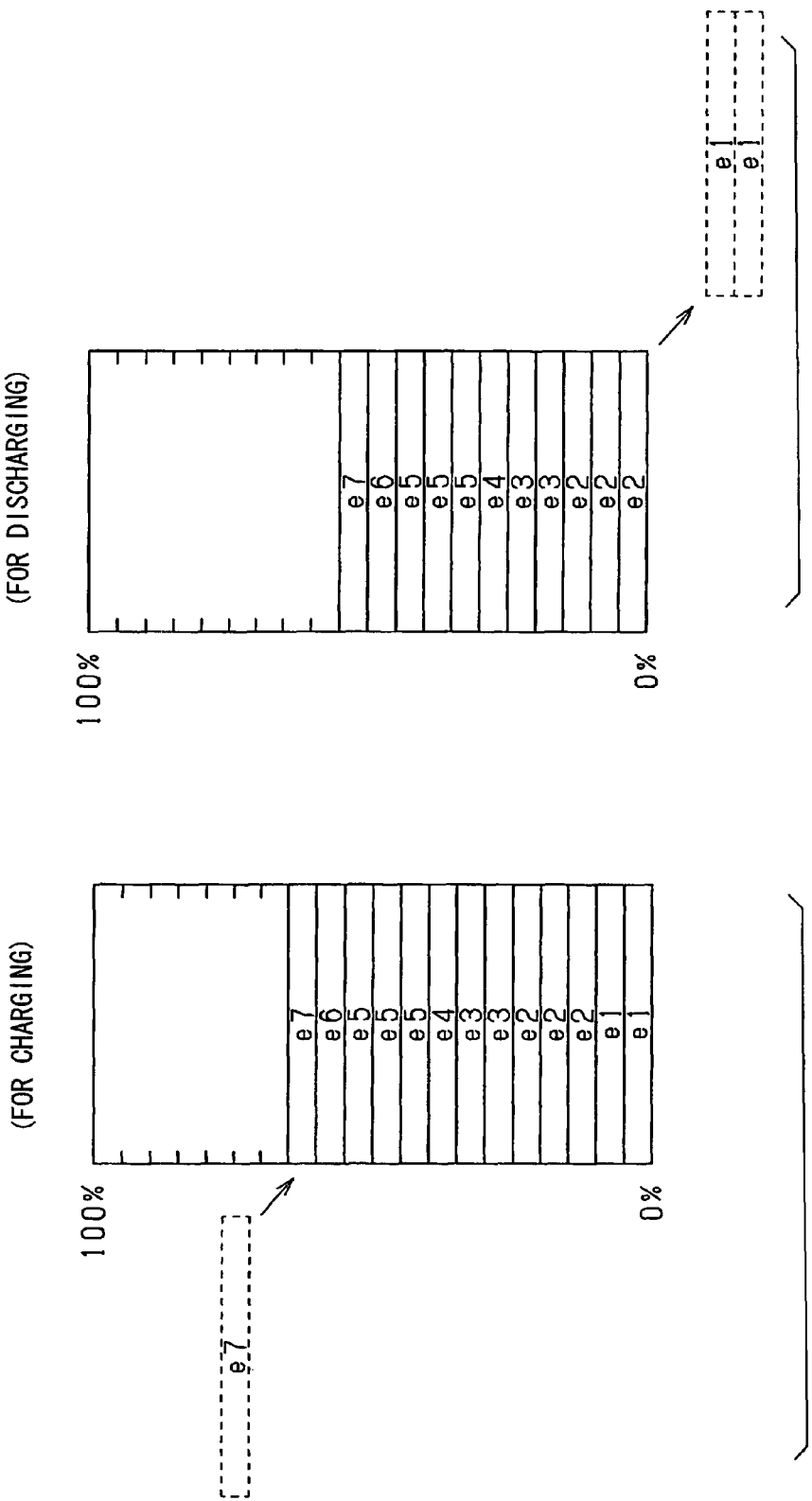
FIGS. 11A and 11B are schematic views showing memorizing modes for remaining amount in a battery and input energy amount.

The calculation of the "COST" may be done in connection with the electric energy charged into the battery 44, namely the "COST" is calculated based on the input energy amount, which is necessary for charging the battery 44. The input energy amount for producing the electric energy to be charged into the battery 44 can be calculated in the same manner to that shown in FIGS. 5A and 5B. Namely, the input energy amount for producing a unit electric energy is calculated and memorized, each time when the unit electric energy is charged. An example is shown in FIG. 11A, in which the unit electric energy is charged, and the input energy amount for the unit electric energy is "e7". In a similar manner, each time when the unit electric energy is taken away from the battery 44, the input energy amount (which was necessary for such taken-away unit electric energy) is removed. An example is shown in FIG. 11B, in which a doubled energy of the unit electric energy is removed from the battery 44.

A dimension for the input energy is "g/kWh", which corresponds to fuel consumption for the unit electric energy. Accordingly, the input energy is calculated based on the increased amount of the fuel consumption for the engine 40, when the energy charging operation from the generator 42 to the battery 44 is carried out by the output torque of the engine 40. When the energy charging operation from the generator 42 to the battery 44 is carried out in a regenerative operation (in which, for example, the brake pedal is pressed), the input energy is regarded as zero, because the fuel consumption is not increased. When the battery 44 is charged by the solar battery 72, the input energy is also regarded as zero, because the fuel consumption is not increased, either.

The "COST" for driving the electric motor 70 can be calculated by use of the table of FIGS. 11A and 11B. For example, as shown in FIG. 11B, when the electric energy calculated at the step S58 is an amount corresponding to the doubled amount of the unit electric energy, the "COST" is calculated by "(e1+e1)/2". Alternatively, an average amount for the unit electric energy, which is the average amount for the input energy necessary for producing electric energy corresponding to a total charged energy in the battery 44, may be used as the "COST".

When the electric energy is generated by the solar power generator (the solar battery) 72, the electric motor 70 may be directly operated by the solar battery 72 and the process for updating the table may be temporally stopped.

When the process of the step S60 has ended, the ECU 60 determines at a step S62 whether the engine 40 is in its operation. This is to determine, for example, whether the engine 40 is temporally stopped as a result of the idling-stop operation. When the ECU 60 determines that the engine 40 is in operation, the ECU determines at the following step S64 whether the "COST" by use of the electric motor 70 for driving the compressor 10 is lower in cost than the use of the engine 40. In other words, the ECU 60 determines whether the "COST" calculated at the step S60 is smaller than the "COST" calculated at the step S56. When the determination at the step S62 is "NO", or when the determination at the step S64 is "YES", the process goes to a step S66.

At the step S66, the ECU 60 determines whether it is possible for the battery 44 (and the solar battery 72) to supply the electric power to the electric motor 70, so that the cooling capacity requirement can be satisfied. This process is to determine whether it is appropriate or not to realize the cooling capacity requirement by the electric motor 70 alone, in view of the remaining amount of the electric power in the battery 44. When the ECU 60 determines "YES" at the step S66, the electric motor 70 is operated at a step S68 in order to realize the compressor output requirement calculated at the step S52.

On the other hand, when the determination at the step S64 is "NO", the process goes to a step S70, at which the output torque of the engine 40 is increased, so that the compressor 10 is operated to increase its output.

Furthermore, when the determination at the step S66 is "NO", the process goes to a step S69, at which the electric motor 70 is preferentially driven by the battery 44 (and the solar battery 72), as much as possible. At the same time, the output torque of the engine 40 is used to compensate any amount of the electric energy, which is running short in the operation of the electric motor 70 by the battery 44 (and the solar battery 72).

The above explained third embodiment has the following advantages.

(1) The air-conditioning system has the engine 40 and the electric motor 70 as the driving source for the compressor 10. Then, the engine 40 and the electric motor 70 are used in a suitable manner (selectively used and/or simultaneously used) based on the input energy amount necessary for realizing the cooling capacity requirement, so that the temperature of the vehicle inside air is controlled. As a result, the fuel consumption can be reduced when controlling the temperature of the vehicle inside air.

(2) The input energy amount to the engine (the fuel amount for the unit cooling capacity calculated at the step S54), which is the input energy for the unit cooling capacity achieved by the engine 40 as the driving source, is calculated. The input energy amount to the electric motor (the fuel amount for the unit cooling capacity calculated at the step S60), which is the input energy for the unit cooling capacity achieved by the electric motor 70 as the driving source, is calculated. Then, the engine 40 and the electric motor 70 are used in the suitable manner (selectively used and/or simultaneously used) based on the above input energy amounts. Accordingly, the input energy amounts can be more exactly calculated depending on the current condition. This means that the engine 40 and the electric motor 70 can be used in a more suitable manner.

(3) The input energy amount to the engine is calculated based on the operation point of the engine 40. The input energy amount to the engine can be, thereby, calculated more exactly.

(4) The input energy amount to the electric motor is calculated based on the table shown in FIGS. 11A and 11B. The electric input energy amount can be, thereby, calculated more exactly.

Fourth Embodiment

A fourth embodiment will be explained with reference to the drawings, by focusing on different points from the third embodiment.

According to the fourth embodiment, the engine 40 and the electric motor 70 are selectively used as the driving source for the compressor 10, depending on the operation point of the engine 40, when the temperature of the vehicle inside air is controlled. More exactly, the engine 40 or the electric motor 70 is selected depending on the rotational speed and the load (the torque) of the engine 40, in accordance with a map shown in FIG. 12.

Figure 13:
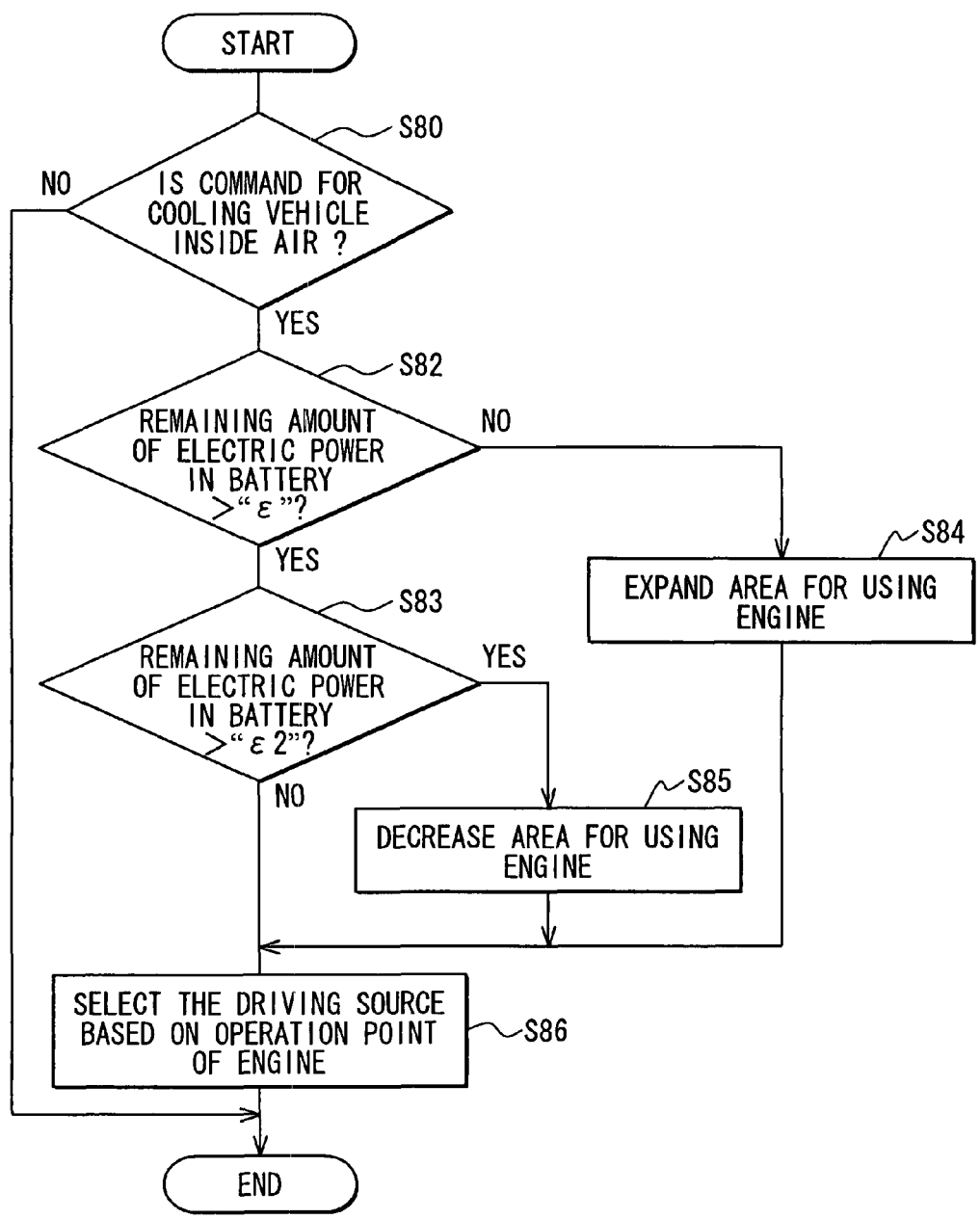
FIG. 13 is a flowchart showing a process for controlling an air-conditioning operation according to the fourth embodiment.

FIG. 13 shows a flowchart for a process of controlling the temperature of the vehicle inside air according to the embodiment. The process of FIG. 13 is repeatedly carried out by the ECU 60 at a predetermined interval.

At first, the ECU 60 determines at a step S80, whether there is a command for cooling the vehicle inside air, based on the operations of the user interface unit 64 and/or the temperature of the vehicle inside air. When "YES" at the step S80, the process goes to a step S82 to determine whether the remaining amount of the electric energy in the battery 44 is larger than a predetermined value "ϵ".

Figure 12:
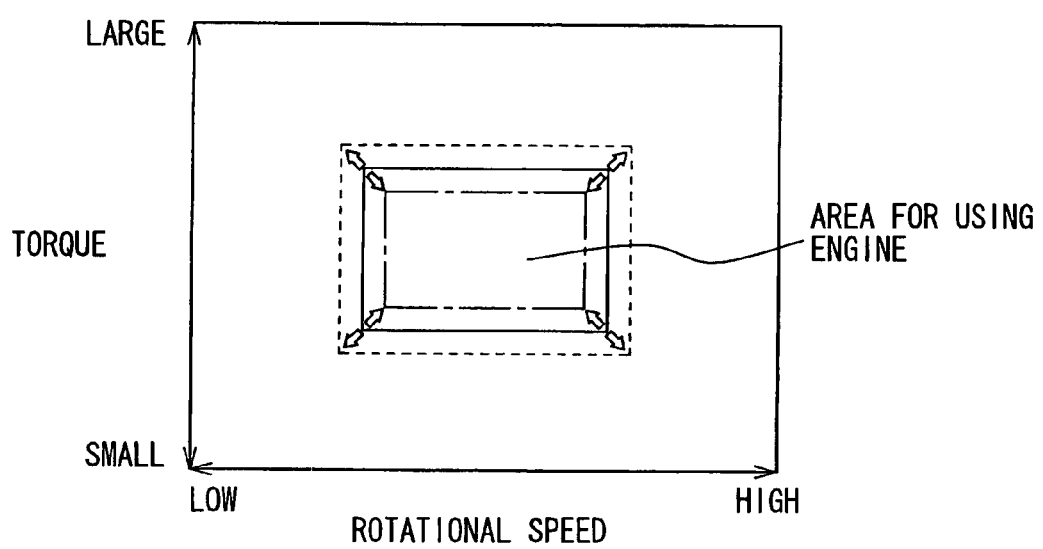
FIG. 12 is a map according to a fourth embodiment showing an area for using the engine.

If the use of the battery 44 was decided simply based on the map shown in FIG. 12, in which an area for using the engine 40 was fixed, the battery 44 may run short of the charged electric energy. Accordingly, in the case that the remaining amount of the electric energy in the battery 44 is smaller than the predetermined value "ϵ", the ECU determines that the engine 40 is preferentially used. Therefore, when the determination at the step S82 is "NO", the area for using the engine 40 is expanded at a step S84, as indicated by a dotted line in FIG. 12.

On the other hand, when the determination at the step S82 is "YES", the ECU 60 determines at a step S83 whether the remaining amount of the electric energy is larger than a predetermined value "ϵ2" ("ϵ2">"ϵ"). This step is carried out for determining whether there is a sufficient amount of the electric energy remaining in the battery 44 and therefore there is no need for the operation of the engine 40. When the determination at the step S83 is "YES", the area for using the engine 40 is decreased at a step S85, as indicated by a one-dot-chain line in FIG. 12. Accordingly, the increase of the fuel consumption by the engine 40 can be suppressed.

When the determination at the step S83 is "NO", or when the process at the step S84 or S85 has ended, the ECU 60 selects the engine 40 or the electric motor 70, based on the map of FIG. 12.

The above explained fourth embodiment has the following advantages.

(1) The map is in advance prepared, according to which the engine 40 or the electric motor 70 is selected as the driving source for the compressor 10 depending on the current operation point of the engine 40. Accordingly, it is possible to reduce a volume of information for which the ECU 60 communicates with other systems, and also to reduce calculation load for the ECU 60, when the ECU 60 selects the engine 40 or the electric motor 70 as the driving source for the compressor 10, in order to reduce the fuel consumption.

(2) When the remaining amount of the charged electric energy in the battery 44 is smaller than "ϵ", the area for using the engine 40 is expanded, whereas when the remaining amount of the charged electric energy is larger than "ϵ2", the area for using the engine 40 is decreased. As a result, an excessive consumption of the electric power of the battery 44 is avoided and an unnecessary consumption of the fuel for the engine 40 can be suppressed.

Fifth Embodiment

A fifth embodiment will be explained with reference to the drawing, by focusing on different points from the third embodiment.

Figure 14:
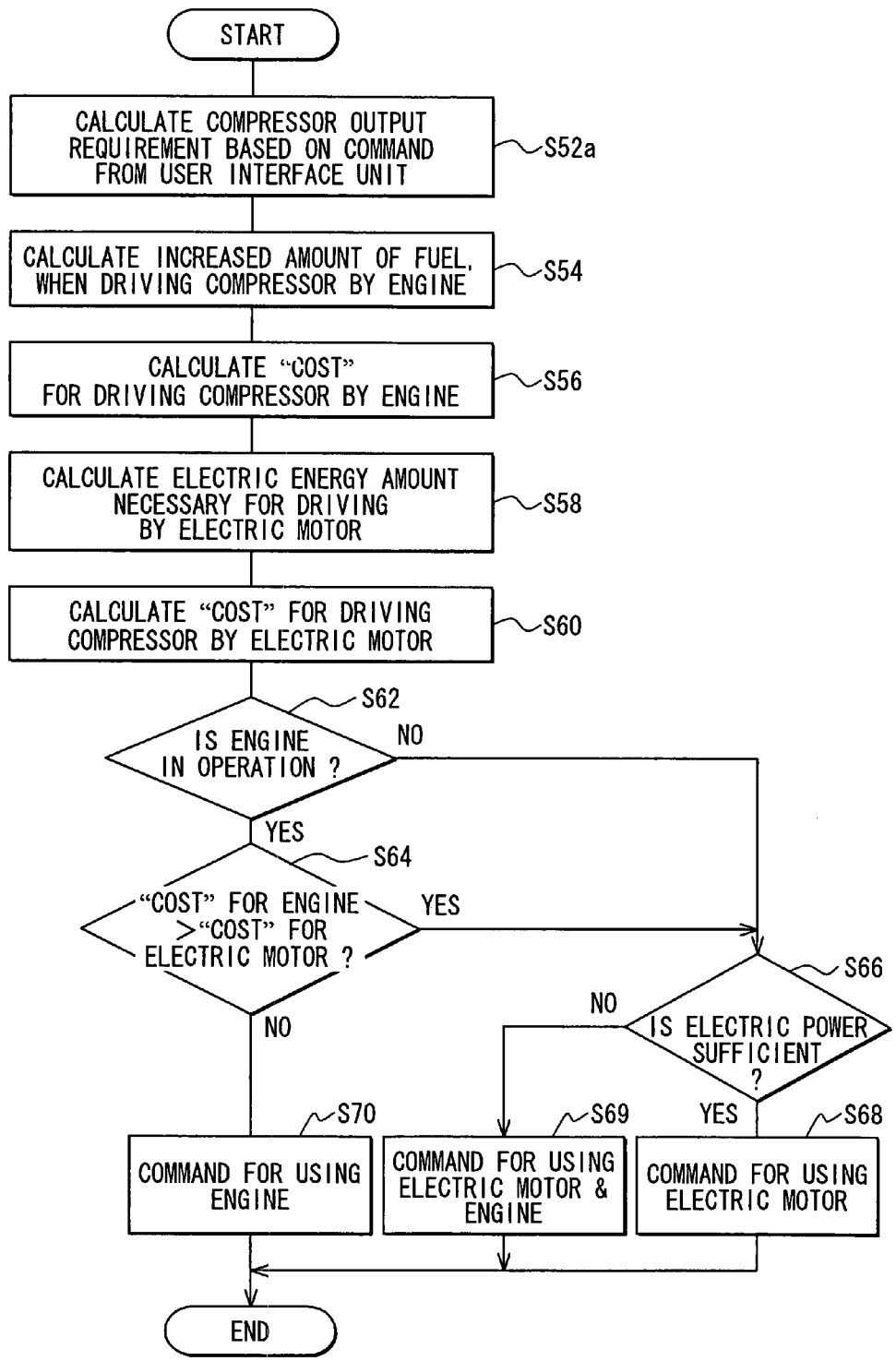
FIG. 14 is a flowchart showing a process for controlling an air-conditioning operation according to a fifth embodiment.

FIG. 14 shows a flowchart for a process of controlling the temperature of the vehicle inside air according to the embodiment. The process of FIG. 14 is repeatedly carried out by the ECU 60 at a predetermined interval. The same reference numerals are used in FIG. 14 for those parts, which are identical or similar to those of the third embodiment (FIG. 10).

As shown in FIG. 14, at a step S52a, the ECU 60 calculates the compressor output requirement based on the information from the user interface unit 64. In other words, the demand for the target temperature for the vehicle inside air, which is inputted through the user interface unit 64, is primarily quantified as the compressor output. As a result, the load for the ECU 60 can be reduced, so that the temperature control for the vehicle inside air can be performed by a simple process.

Other Embodiments

The above embodiments may be further modified in the following manners.

In the above embodiments, the capacity variable type compressor 10 is used as the means for varying the cooling capacity for the air-conditioning system. However, instead of such compressor, a suction throttling valve (STV) may be provided between the compressor and the evaporator for controlling the flow amount of the refrigerant.

The operation point of the engine is decided by the rotational speed and the torque in the above second embodiment. An intake air amount may be used instead of the torque, in case of the gasoline engine. A fuel injection amount may be used instead of the torque, in case of the diesel engine. Furthermore, the heat source may be selected by use of a map, based on not only the operation point of the engine but also the vehicle speed, the ambient temperature and so on. According to such a modification, the selection of the heat source can be more appropriately done to decrease the fuel consumption.

In the above first and second embodiments, the electric motor may be used in place of the engine 40, as the driving source for the compressor 10.

In the above fourth embodiment, an intake air amount may be likewise used instead of the torque in case of the gasoline engine, or a fuel injection amount may be used instead of the torque in case of the diesel engine.

In the above third and fourth embodiments, the number of the driving source for the compressor 10 may not be limited to two.

In the above embodiments, the engine is explained as to be connected to vehicle driving wheels. However, the present invention may be applied to such a vehicle, in which the engine is not always connected to the vehicle driving wheels, for example, in the case of the hybrid car. Furthermore, the present invention may be effectively applied to an electric vehicle, when the vehicle has multiple heat sources or multiple driving sources, in view of reducing the input energy. In the case of the electric vehicle, the input energy may be defined as an input energy which is inputted from the outside of the vehicle, in other words, it may be defined as the electric energy inputted to the electric vehicle other than the electric energy generated inside the vehicle. As a result that the input energy amount is defined as the input amount of the energy which is inputted to the vehicle from the outside, it becomes possible to reduce the energy consumption for the energy inputted from the outside.

What is claimed is:

1. An air-conditioning system for a vehicle comprising:
multiple heat sources for performing cooling operation, one of which is an evaporator to which refrigerant compressed by a compressor is supplied, wherein the compressor is driven by an engine for driving the vehicle, and the other of which is a heat accumulator for storing the heat of the refrigerant;
means for comparing a first input energy amount, which is an increased amount of fuel to be consumed by the engine necessary for generating a unit cooling capacity by the evaporator with a second input energy amount, which is an increased amount of fuel already consumed by the engine and which is necessary for generating the unit cooling capacity by the heat accumulator; and
means for selecting one of the first and second input energy amounts, whichever is smaller than the other, for preferentially using such selected input energy amount in order to perform the cooling operation to control the temperature of the vehicle inside air.

2. An air-conditioning system according to claim 1, further comprising:
a first calculating means for calculating the first input energy amount of energy, which is inputted to the compressor for achieving the unit cooling capacity by the evaporator; and
a second calculating means for calculating the second input energy amount of energy, which is inputted to the heat accumulator for achieving the unit cooling capacity by the heat accumulator,
wherein the selecting means selects one of the heat sources which is preferentially used, based on the input energy amounts respectively inputted to the evaporator and the heat accumulator.

3. An air-conditioning system according to claim 2, wherein
the engine for the vehicle is an internal combustion engine, and
the first calculating means calculates the input energy amount of energy, which is inputted to the compressor, based on an operation point of the internal combustion engine.

4. An air-conditioning system according to claim 2, wherein
the second calculating means comprises a memory means, wherein
the memory means memorizes the input energy amount of energy for producing a unit of heat, each time when the unit of heat for achieving the unit cooling capacity is stored in the heat accumulator,
the input energy amount of energy for producing the unit of heat is removed from the memory means, each time when the unit of heat is taken away from the heat accumulator, and
the second calculating means calculates the input energy amount based on the input energy amount memorized in the memory means.

5. An air-conditioning system according to claim 4, wherein
any amount of heat which is naturally radiated from the heat accumulator to the outside is removed from a sum total of the input amount of energy from the memory means.

6. An air-conditioning system according to claim 1, wherein
the engine for the vehicle is an internal combustion engine, and
the selecting means has a map, based on which the selecting means selects the evaporator or the heat accumulator in accordance with the current operation point of the engine.

7. An air-conditioning system according to claim 1, wherein
the selecting means selects the evaporator independently from the input energy amount for the unit cooling capacity, when an accumulated amount of heat in the heat accumulator is smaller than a predetermined value.

8. An air-conditioning system according to claim 1, wherein
the selecting means has a further function for storing the heat in the heat accumulator, when the input energy amount to the compressor is smaller than a predetermined value.

9. An air-conditioning system according to claim 1, wherein
the increased amount of fuel is calculated based on a difference of operation points of the engine.

10. An air-conditioning system for a vehicle comprising:
a refrigerating cycle including a compressor driven by an engine, a condenser, and an evaporator, wherein the compressor, the condenser, and the evaporator are connected in a closed circuit;
a heat accumulator connected to the refrigerating cycle in parallel to the evaporator, so that refrigerant of the refrigerating cycle operatively flows in a closed circuit of the compressor, the condenser, and the heat accumulator; and
an electronic control unit configured to control a cooling operation of the refrigerating cycle,
wherein the electronic control unit is configured to compare a first input energy amount, which is an increased amount of fuel to be consumed by the engine necessary for generating a unit cooling capacity by the evaporator with a second input energy amount, which is an increased amount of fuel already consumed by the engine and which is necessary for generating the unit cooling capacity by the heat accumulator, wherein the electronic control unit is configure to select the evaporator or the heat accumulator, in such a way that such selected first or second input energy amount is smaller than the other input energy amount, and wherein the selected evaporator or heat accumulator is preferentially used for performing the cooling operation to control temperature of vehicle inside air.

11. An air-conditioning system for a vehicle comprising:

a first and a second heat source for performing cooling operation; and means for comparing a first input energy amount, which is an increased amount of fuel to be consumed by an engine of the vehicle necessary for generating a unit cooling capacity by the first heat source with a second input energy amount, which is an increased amount of fuel already consumed by the engine necessary for generating a unit cooling capacity by the second heat source; and means for selecting one of the first and second input energy amounts, whichever is smaller than the other, for preferentially using such selected input energy amount in order to perform the cooling operation to control the temperature of the vehicle inside air.

12. An Air-conditioning system according to claim 11, wherein the increased amount of fuel is calculated based on a difference of operation points of the engine.

13. A method of operating an air-conditioning system for a vehicle, the method comprising:

providing multiple heat sources for performing cooling operation, one of which is an evaporator to which refrigerant compressed by a compressor is supplied, wherein the compressor is driven by an engine for driving the vehicle, and the other of which is a heat accumulator for storing the heat of the refrigerant;

comparing a first input energy amount, which is an increased amount of fuel to be consumed by the engine necessary for generating a unit cooling capacity by the evaporator with a second input energy amount, which is an increased amount of fuel already consumed by the engine and which is necessary for generating the unit cooling capacity by the heat accumulator; and selecting one of the first and second input energy amounts, whichever is smaller than the other, for preferentially using such selected input energy amount in order to perform the cooling operation to control the temperature of the vehicle inside air.

14. The method according to claim 13, further comprising:

calculating the first input energy amount of energy, which is inputted to the compressor for achieving the unit cooling capacity by the evaporator; and calculating the second input energy amount of energy, which is inputted to the heat accumulator for achieving the unit cooling capacity by the heat accumulator, wherein one of the heat sources, which is preferentially used, is selected based on the input energy amounts respectively inputted to the evaporator and the heat accumulator.

15. A method according to claim 14, wherein the engine for the vehicle is an internal combustion engine, and the input energy amount of energy, which is inputted to the compressor, is calculated based on an operation point of the internal combustion engine.

16. A method according to claim 14, further comprises storing, in a memory, the input energy amount of energy for producing a unit of heat, each time when the unit of heat for achieving the unit cooling capacity is stored in the heat accumulator, wherein the input energy amount of energy for producing the unit of heat is removed from the memory each time when the unit of heat is taken away from the heat accumulator, and the input energy amount is calculated based on the input energy amount stored in the memory.

17. A method according to claim 16, wherein any amount of heat which is naturally radiated from the heat accumulator to the outside is removed from a sum total of the input amount of energy from the memory.

18. A method according to claim 14, wherein the engine for the vehicle is an internal combustion engine, and the evaporator or the heat accumulator is selected based on a map and in accordance with the current operation point of the engine.

19. A method according to claim 14, wherein the evaporator is selected independently from the input energy amount for the unit cooling capacity, when an accumulated amount of heat in the heat accumulator is smaller than a predetermined value.

20. A method according to claim 14, wherein the selecting includes storing the heat in the heat accumulator, when the input energy amount to the compressor is smaller than a predetermined value.

21. A method according to claim 13, wherein the input energy amount necessary for generating the unit cooling capacity corresponds to an increased amount of fuel which is consumed for the unit cooling capacity.

22. A method according to claim 21, wherein the increased amount of fuel is calculated based on a difference of operation points of the engine.

23. A method of operating an air conditioning system for a vehicle, the method comprising:

providing a first and a second heat source for performing cooling operation; and comparing a first input energy amount, which is an increased amount of fuel to be consumed by an engine of the vehicle necessary for generating a unit cooling capacity by the first heat source with a second input energy amount, which is an increased amount of fuel already consumed by the engine necessary for generating a unit cooling capacity by the second heat source; and selecting one of the first and second input energy amounts, whichever is smaller than the other, for preferentially using such selected input energy amount in order to perform the cooling operation to control the temperature of the vehicle inside air.

24. A method according to claim 23, wherein the increased amount of fuel is calculated based on a difference of operation points of the engine.

* * * * *